United States Patent [19]

Hirahara

[11] Patent Number: 5,402,480
[45] Date of Patent: Mar. 28, 1995

[54] CALL SIGNAL GENERATING CIRCUIT
[75] Inventor: Minoru Hirahara, Kawasaki, Japan
[73] Assignee: Fujitsu Limited, Kanagawa, Japan
[21] Appl. No.: 931,000
[22] Filed: Aug. 17, 1992
[30] Foreign Application Priority Data Aug. 30, 1991 [JP] Japan .................. 3-219918

[51] Int. Cl.⁶ ............................................ H04M 1/50
[52] U.S. Cl. .................... 379/253; 379/254;
  379/255; 379/418; 363/44; 363/89; 363/127
[58] Field of Search ............... 379/253, 254, 255, 418;
  363/44, 89, 127

[56] References Cited

U.S. PATENT DOCUMENTS

| | | | |
|---|---|---|---|
| 4,436,960 | 3/1984 | Harmon | 379/418 |
| 4,656,659 | 4/1987 | Chea | 379/253 |
| 4,703,500 | 10/1987 | Pollard | 379/252 |
| 4,866,585 | 9/1989 | Das | 363/127 |
| 5,122,760 | 6/1992 | Nishijima | 363/127 |
| 5,134,355 | 7/1992 | Hastings | 363/89 |

FOREIGN PATENT DOCUMENTS

| | | | |
|---|---|---|---|
| 0132889 | 10/1981 | Japan | 379/418 |
| 0247153 | 11/1986 | Japan | 379/418 |
| 0308458 | 12/1988 | Japan | 379/418 |

Primary Examiner—James L. Dwyer
Assistant Examiner—Michael N. Lau

[57] ABSTRACT

A call signal generating circuit includes a step-up transformer having a primary winding and secondary windings and a first switching circuit coupled between the primary winding of the step-up transformer and a D.C. power source for turning ON/OFF at a frequency higher than a frequency of a call signal. A rectifying circuit is coupled to the secondary windings of the step-up transformer for rectifying voltages induced at the secondary windings into a positive polarity voltage and a negative polarity voltage. A second switching circuit is coupled to the rectifying circuit for alternatively outputting the positive polarity voltage and the negative polarity voltage with a quiescent time in which both the positive and negative polarity voltages are not output. A capacitor is coupled to the second switching circuit for receiving the positive and negative polarity voltages output from the second switching circuit. A third switching circuit is provided in the call signal generating circuit for discharging the capacitor during the quiescent time. A pair of output terminals are coupled to the capacitor for outputting the generated call signal.

9 Claims, 7 Drawing Sheets

TIME

TIME →

CALL SIGNAL GENERATING CIRCUIT

BACKGROUND OF THE INVENTION

The present invention generally relates to call signal generating circuits, and more particularly to a call signal generating circuit which generates a call signal by carrying out a switching control.

A call signal which is used to call and ring the bell of the telephone set from the switching system is also sometimes referred to as a ringing signal. For example, a low-frequency signal of 16 Hz and 75 V is turned ON for one second and turned OFF for two seconds to form the call signal. The call signal is generated by a call signal generating circuit, and there is a demand to improve the characteristic and efficiency of the call signal generating circuit. The call signal was originally a sinusoidal wave, but the call signal was replaced by a staircase wave which approximates the crest factor of the sinusoidal wave.

Generally, the voltage supplied from the switching system to the telephone set of the subscriber is 48 V. On the other hand, the call signal has the frequency of 16 Hz and the peak voltage of 75 V. Hence, a step-up transformer is used to boost the voltage when forming the call signal. However, the step-up transformer designed for the low-frequency of approximately 16 Hz is bulky, and the method of boosting the voltage using a high-frequency signal was conventionally used.

Figure 1:
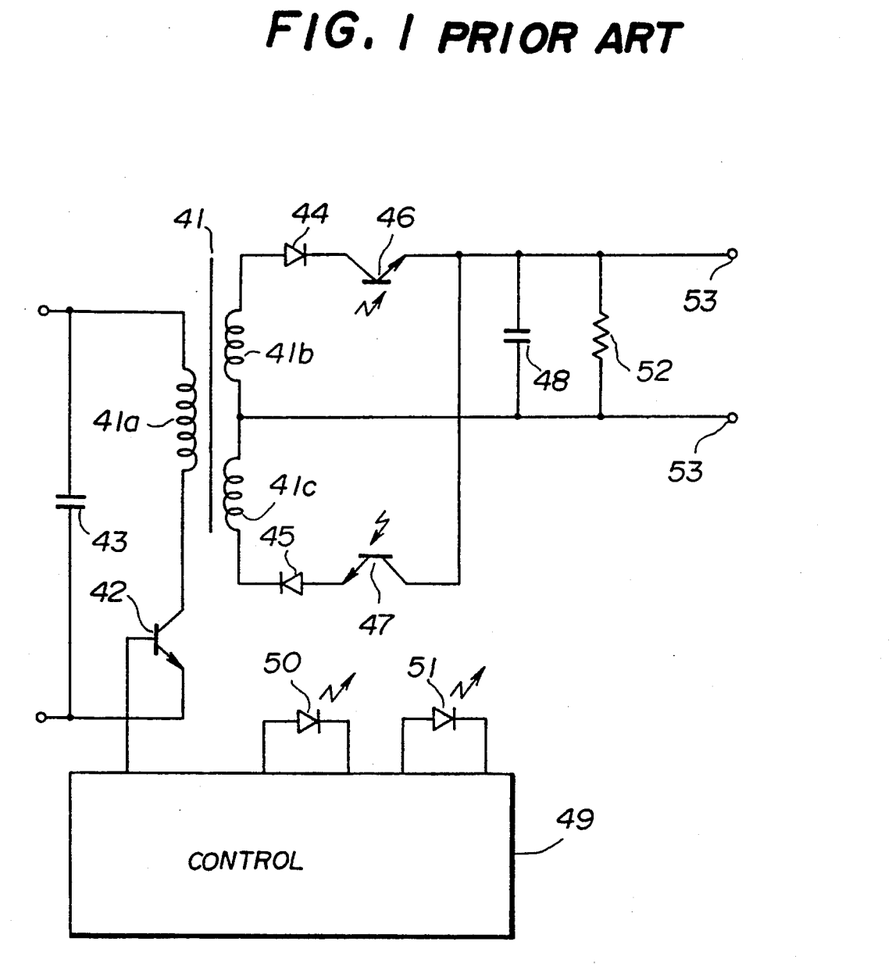
FIG. 1 is a circuit diagram showing an example of a conventional call signal generating circuit.

FIG. 1 shows an example of a conventional call signal generating circuit. The conventional call signal generating circuit includes a transformer 41 having a primary winding 41a and secondary windings 41b and 41c, a transistor 42, a capacitor 43, diodes 44 and 45, phototransistors 46 and 47, a capacitor 48, a control circuit 49, photodiodes 50 and 51, a dummy resistor 52 and output terminals 53 which are connected as shown in FIG.1.

A D.C. voltage is applied to the primary winding 41a of the transformer 41 via the transistor 42, and this transistor 42 is turned ON/OFF at a frequency of several tens of kHz to several hundred kHz by the control circuit 49. Accordingly, compared to the case where the 16 Hz signal is boosted, it is possible to reduce the size of the transformer 41. The voltage of several tens of kHz to several hundred kHz induced at the secondary windings 41b and 41c of the transformer 41 due to the ON/OFF control of the transistor 42 is rectified by the diodes 44 and 45. The diode 44 rectifies the voltage into a positive polarity voltage, while the diode 45 rectifies the voltage into a negative polarity voltage. The phototransistors 46 and 47 are respectively turned ON/OFF by the voltages from the diodes 44 and 45, and the phototransistors 46 and 47 are turned ON/OFF alternately. Hence, a positive polarity voltage from the phototransistor 46 and a negative polarity voltage from the phototransistor 47 are output alternately, and a call signal of 16 Hz is output via the output terminals 53.

In this case, a photo coupler is formed by the phototransistor 46 and the photodiode 50, and another photo coupler is formed by the phototransistor 47 and the photodiode 51. The photodiodes 50 and 51 are alternately driven by the control circuit 49 for a time which is shorter than one-half the period of the 16 Hz call signal. Accordingly, the phototransistors 46 and 47 are alternately turned ON with respective quiescent times. The capacitor 48 is provided to eliminate switching frequency components of several tens of kHz to several hundred kHz induced at the secondary windings 41b and 41c, other high-frequency components and the like. The dummy resistor 52 is provided to discharge the capacitor 48.

Figure 2:
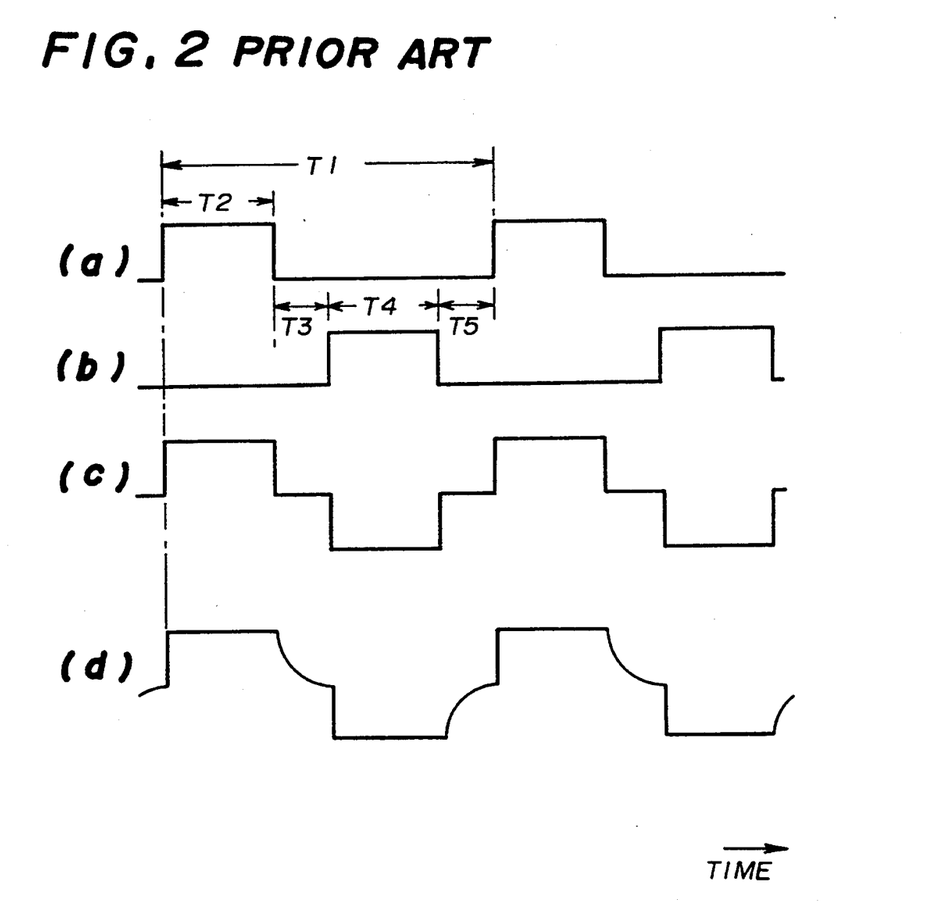
FIG. 2 is a time chart for explaining the operation of the conventional call signal generating circuit shown in FIG. 1.

FIG.2 is a time chart for explaining the operation of the conventional call signal generating circuit shown in FIG. 1. In FIG. 2, (a) shows a current supplied to the photodiode 50, (b) shows a current supplied to the photodiode 51, and (c) and (d) show the call signal output via the output terminals 53. As described above, the photodiodes 50 and 51 receive the currents from the control circuit 49. If the 16 Hz call signal has a period T1, the current is supplied to the photodiode 50 for a time T2, the current is supplied to the photodiode 51 for a time T4 and quiescent times T3 and T5 are provided as shown in FIG. 2, measures are taken so that T1=T2+T3+T4+T5, T2=T4 and T3=T5. In this case, the crest factor of the sinusoidal signal which is equal to (crest value)/(effective value) is 1.414, and the quiescent times T3 and T5 are set so as to approximate this crest factor. The effective value is the average of the square of the instantaneous value of one period of the fundamental wave, and the crest value is the peak value of the wave.

When the currents are supplied to the photodiodes 50 and 51 which form the photo coupler with the respective phototransistors 46 and 47, the phototransistors 46 and 47 are turned ON by the light from the photodiodes 50 and 51 applied to the bases of the phototransistors 46 and 47. The phototransistors 46 and 47 are respectively turned ON during the times T2 and T4 in FIG. 2. As a result, it is possible to obtain the call signal which has the staircase waveform with the crest factor approximating the crest factor of the sinusoidal wave.

If the dummy resistor 52 is omitted and the call signal generating circuit assumes a low-load state, it becomes equivalent to the case where the discharge time constant of the capacitor 48 is large. Hence, the falling edge (and the corresponding rising edge) of the waveform becomes gradual in this case as shown in FIG.2 (d). That is, the waveform shown in FIG. 2 (d) is different from the waveform which is set to have the crest factor approximating the crest factor of the sinusoidal wave and does not meet the specifications. Therefore, the dummy resistor 52 is essential in the conventional call signal generating circuit.

As described above, the 16 Hz call signal is generally used. However, in order to reduce the size of the step-up transformer, the method of boosting the voltage by a high-frequency switching is conventionally used. In this case, the call signal used has the staircase waveform shown in FIG. 2 (c) which has the crest factor approximating the crest factor of the sinusoidal wave. The dummy resistor 52 is provided to maintain this staircase waveform shown in FIG. 2 (c). However, there were problems in that a power loss is introduced at the dummy resistor 52 and that the heat generated from the dummy resistor 52 prevented the effective reduction of the size of the call signal generating circuit.

In other words, the power loss at the dummy resistor 52 is large if the resistance of the dummy resistor 52 is small. However, the discharge of the capacitor 48 becomes insufficient if the resistance of the dummy resistor 52 is made large in order to reduce the power loss. For this reason, it was inevitable to set the resistance of the dummy resistor 52 to the small value in order to ensure sufficient discharge of the capacitor 48, although the unwanted power loss occurred.

SUMMARY OF THE INVENTION

Accordingly, it is a general object of the present invention to provide a novel and useful call signal generating circuit in which the problems described above are eliminated.

Another and more specific object of the present invention is to provide a call signal generating circuit comprising a step-up transformer having a primary winding and secondary windings, first switching means, coupled between the primary winding of the step-up transformer and a D.C. power source, for turning ON/OFF at a frequency higher than a frequency of a call signal which is to be generated by the call signal generating circuit, rectifying means, coupled to the secondary windings of the step-up transformer, for rectifying voltages induced at the secondary windings into a positive polarity voltage and a negative polarity voltage, second switching means, coupled to the rectifying means, for alternatively outputting the positive polarity voltage and the negative polarity voltage with a quiescent time in which both the positive and negative polarity voltages are not output, a capacitor, having first and second terminals coupled to the second switching means, for receiving the positive and negative polarity voltages output from the second switching means, a resistor coupled to the first terminal of the capacitor, third switching means, coupled to the resistor, for discharging the capacitor during the quiescent time, the resistor and the third switching means being coupled in series to form a series circuit which is coupled in parallel to the first and second terminals of the capacitor, and a pair of output terminals, respectively coupled to the first and second terminals of the capacitor, for outputting the call signal. According to the call signal generating circuit of the present invention, the power loss introduced at the resistor is reduced to a negligible extent because the third switching means is turned ON/OFF, and the heat generated by the resistor is accordingly reduced. Therefore, the size of the call signal generating circuit can be reduced compared to the conventional call signal generating circuit. In addition, the falling edge (and the corresponding rising edge) of the call signal can be made sharp by the provision of the third switching means.

Other objects and further objects of the present invention will be apparent from the following detailed description when read in conjunction with the accompanying drawings.

DESCRIPTION OF THE PREFERRED EMBODIMENTS

First, a description will be given of the operating principle of a call signal generating circuit according to the present invention, by referring to FIG. 3.

Figure 3:
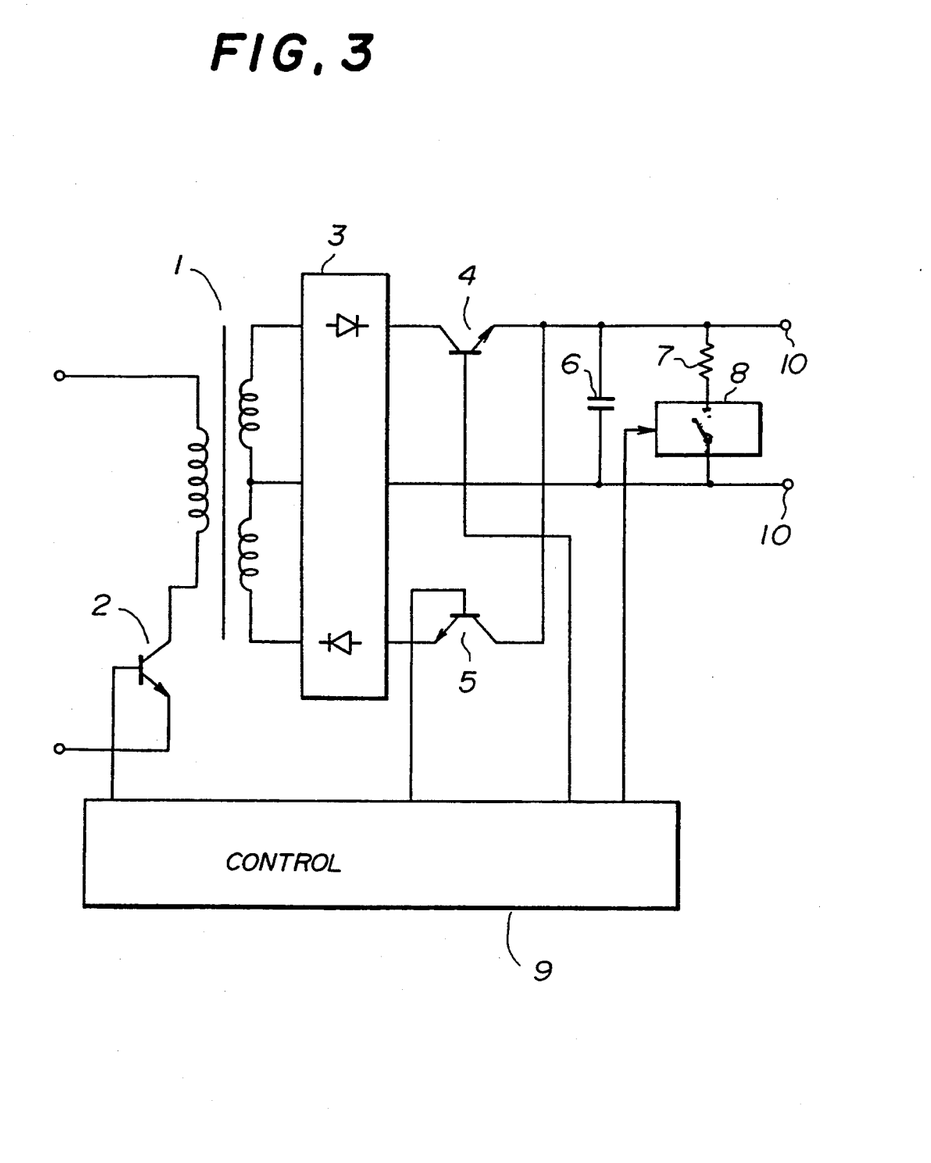
FIG. 3 is a circuit diagram for explaining the operating principle of a call signal generating circuit according to the present invention.

The call signal generating circuit shown in FIG. 3 includes a transformer 1, a transistor 2, a rectifying circuit 3, transistors 4 and 5, a capacitor 6, a resistor 7, a switching circuit 8, a control circuit 9, and output terminals 10 which are connected 5 as shown.

The transistor 2 is connected between the primary winding of the transformer 1 and the D.C. power source (not shown), and this transistor 2 is turned ON/OFF at a frequency which is high compared to the frequency of the call signal which is generated by the call signal generating circuit. The rectifying circuit 3 rectifies the voltages induced at the secondary windings of the transformer 1 into positive and negative polarity voltages.

The transistors 4 and 5 are alternately turned ON/OFF depending on the period of the call signal so as to respectively output the positive and negative polarity voltages from the rectifying circuit 3. The transistors 4 and 5 are controlled so that there exist quiescent times in which both the transistors 4 and 5 are turned OFF simultaneously. The positive and negative polarity voltages from the transistors 4 and 5 are applied to the capacitor 6.

The switching circuit 8 is turned ON during the quiescent time in which both the transistors 4 and 5 are OFF simultaneously. When the switching circuit 8 is ON, the charge in the capacitor 6 is discharged via the resistor 7. The control circuit 9 controls the transistors 2, 4 and 5, and the switching circuit 8. The call signal is output via the output terminal 10.

As described above, the voltages are induced 5 at the secondary windings of the transformer 1 by turning the transistor 2 at a frequency higher than the frequency of the call signal. The voltages induced at the secondary windings of the transformer 1 are rectified into the positive and negative polarity voltages by the rectifying circuit 3, and the positive polarity voltage is output via the transistor 4 while the negative polarity voltage is output via the transistor 5. Accordingly, by alternately turning the transistors 4 and 5 ON/OFF, it is possible to output a 16 Hz call signal from the output terminals 10.

By providing the quiescent time in which both the transistors 4 and 5 are turned OFF simultaneously, it is possible to obtain a call signal which has the staircase waveform. The charge in the capacitor 6 is discharged via the resistor 7 by turning the switching circuit 8 ON during the quiescent time. In other words, even under the low-load state, it is possible to make the falling edge (and the corresponding rising edge) of the staircase wave sharp. In addition, because the switching circuit 8 is turned OFF during the time in which the positive or negative polarity voltage is output via the transistors 4 or 5, no power loss is introduced due to the resistor 7 during this time.

Next, a description will be given of an embodiment of the call signal generating circuit according to the present invention, by referring to FIG. 4.

Figure 4:
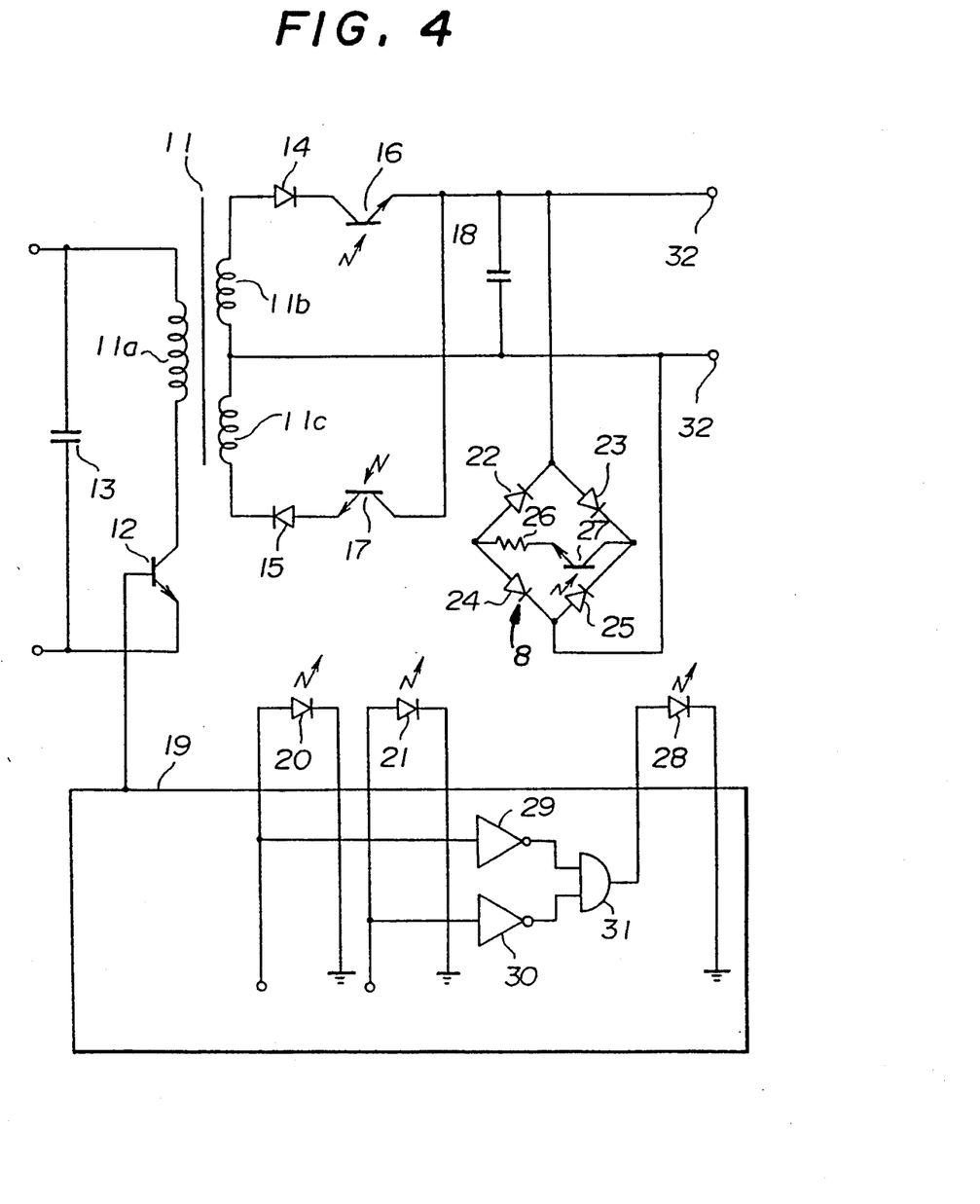
FIG. 4 is a circuit diagram showing an embodiment of the call signal generating circuit according to the present invention.

The call signal generating circuit shown in FIG. 4 includes a transformer 11 having a primary winding 11a and secondary windings 11b and 11c, a transistor 12 connected to the primary winding 11a of the transformer 11, a capacitor 13, diodes 14 and 15, phototransistors 16 and 17, a capacitor 18, a control circuit 19, photodiodes 20 and 21, diodes 22 through 25, a resistor 26, a phototransistor 27, a photodiode 28, and output terminals 32 which are connected as shown. The control 5 circuit 19 includes inverters 29 and 30, and an AND circuit 31 which are connected as shown.

The diodes 22 through 25, the phototransistor 27 and the photodiode 28 form a switching circuit 8 which corresponds to the aforementioned switching circuit 8 shown in FIG. 3. By connecting the diodes 22 through 25 to form a bridge connection, it is possible to use a unipolarity switching element such as the phototransistor 27. A photo coupler is formed by the phototransistor 16 and the photodiode 20, and another photo coupler is formed by the phototransistor 17 and the photodiode 21. A photo coupler is also formed by the phototransistor 27 and the photodiode 28. It is of course possible to use a normal transistor in place of each of these photo couplers.

The control circuit 19 controls the transistor 12 so that the transistor 12 turns ON/OFF at a frequency on the order of several tens of kHz. In addition, the control circuit 19 alternately supplies a current to the photodiodes 20 and 21 with the quiescent time. This control circuit 19 includes the inverters 29 and 30, and the AND circuit 31. The control circuit 19 may be realized by logic circuits or a programs of a microprocessor, similarly as in the case of the conventional call signal generating circuit.

The transistor 12 which is connected to the primary winding 11a of the transformer 11 is turned ON/OFF by the control circuit 19 at the frequency of several tens of kHz, and the voltages induced at the secondary windings 11b and 11c of the transformer 11 are respectively rectified into the positive and negative polarity voltages by the diodes 14 and 15. The positive and negative polarity voltages are respectively applied to the phototransistors 16 and 17. In addition, because the current is alternately supplied to the photodiodes 20 and 21 with the quiescent time to emit light from the photodiodes 20 and 21, the phototransistors 16 and 17 turn ON/OFF responsive to the light from the corresponding photodiodes 20 and 21. As a result, the positive and negative polarity voltages are alternately output from the output terminals 32 with the quiescent time.

During the time in which the current is supplied to the photodiodes 20 and 21, the output of the AND circuit 31 is "0" and thus, the photodiode 28 does not emit light. Accordingly, the phototransistor 27 is OFF during this time, and no current flows to the resistor 26 during the time in which the positive or negative polarity voltage is output. Furthermore, during the quiescent time in which no current is supplied to the photodiodes 20 and 21, the output of the AND circuit 31 is "1" and thus the photodiode 28 emits light in response to the current which is received. Therefore, the phototransistor 27 is turned ON responsive to the light emitted from the photodiode 28, and the charge of the capacitor 18 is discharged by the resistor 26 during the quiescent time of the phototransistors 16 and 17 via the bridge-connected diodes 22 through 25 and the phototransistor 27. In other words, even in the low-load state, it is possible to make the falling edge (and the corresponding rising edge) of the call signal waveform sharp.

Figure 5:
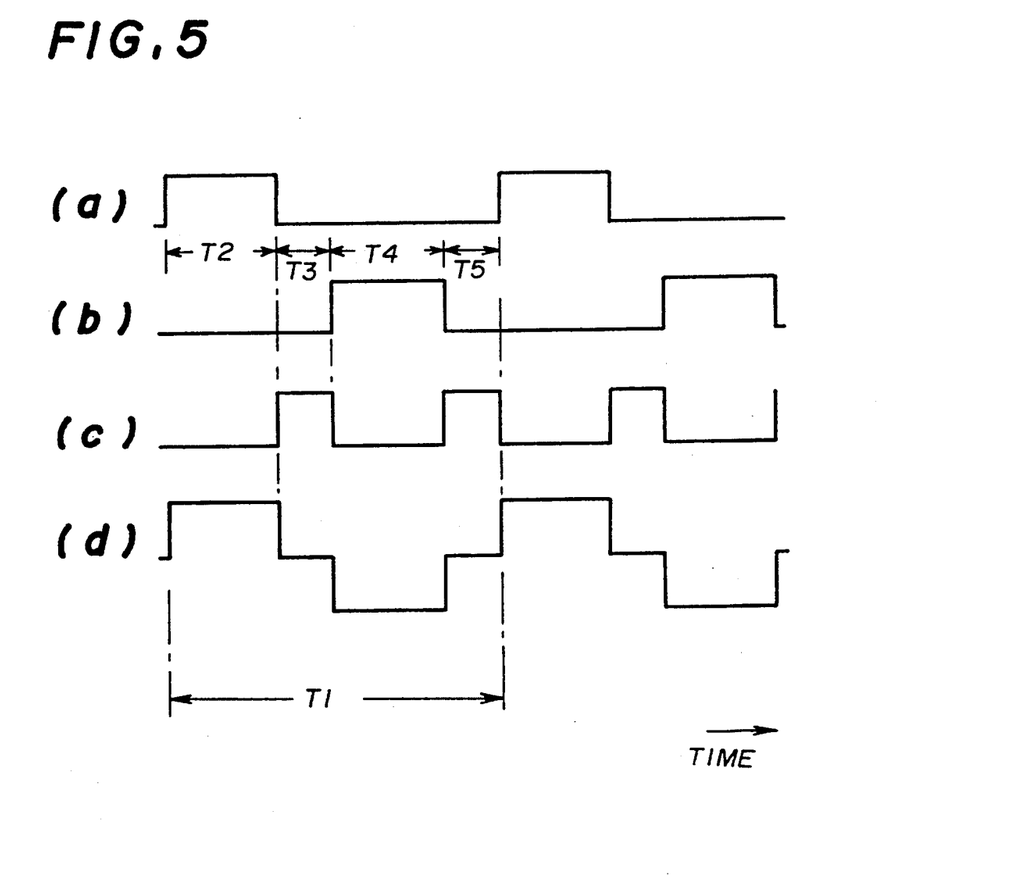
FIG. 5 is a time chart for explaining the embodiment shown in FIG. 4.

FIG. 5 is a time chart for explaining the operation of the embodiment shown in FIG. 4. In FIG. 5, (a) shows the current supplied to the photodiode 20, (b) shows the current supplied to the photodiode 21, (c) shows the current supplied to the photodiode 28, and (d) shows the call signal output from the output terminals 32. If one period of the 16 Hz call signal is denoted by T1, the relationship T1=T2+T3+T4+T5, T2=T4 and T3=T5 stand, similarly as in the case of the conventional call signal generating circuit. The phototransistor 27 turns ON during the quiescent times T3 and T5 so as to discharge the charge of the capacitor 18. Hence, the call signal shown in FIG. 5 (d) having the sharp falling edge (and corresponding rising edge) is output from the output terminals 21.

The circuit construction of the switching circuit 8 is not limited to that of the embodiment shown in FIG. 4. For example, it is possible to form the switching circuit 8 by analog switching elements, instead of forming the neutral switching circuit from the phototransistors 27 and the bridge-connected diodes 22 through 25. Moreover, it is possible to provide two single polarity switching elements such as the phototransistor 27 and to discharge the charge of the capacitor 18 by turning ON the single polarity switching elements depending on the sequence with which the current is supplied to the photodiodes 20 and 21, that is, depending on the charge polarity of the capacitor 18.

Figure 6:
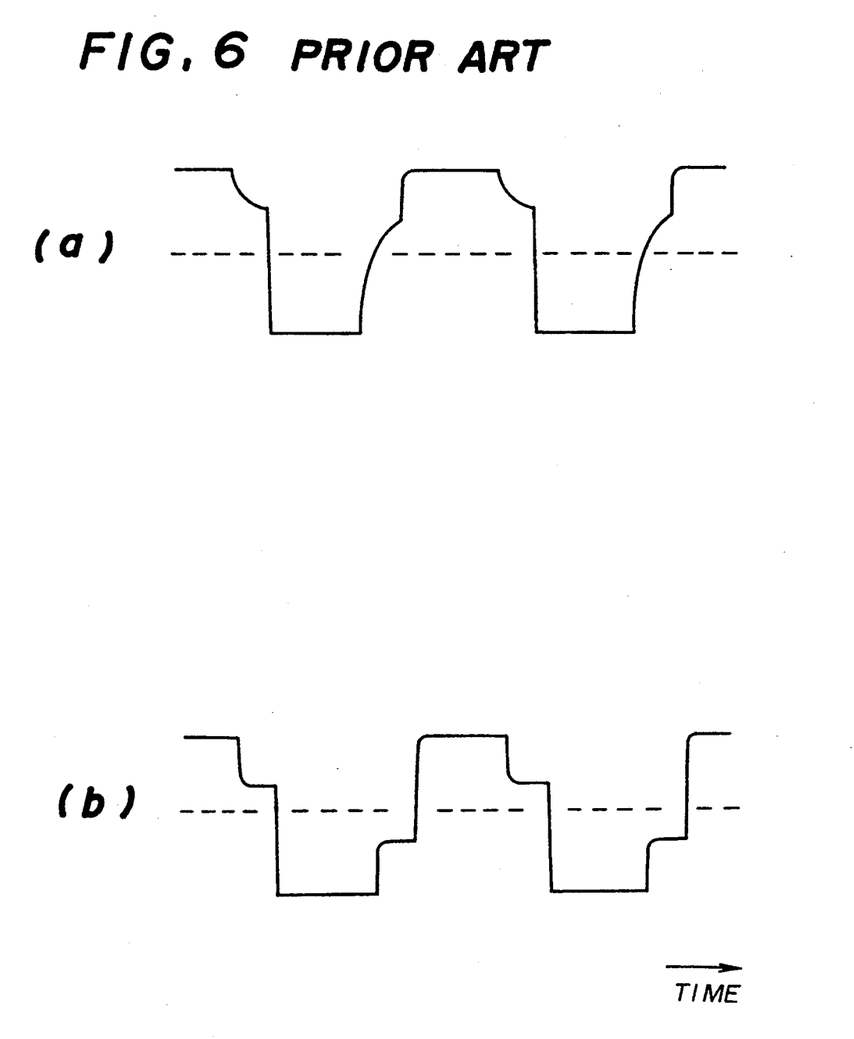
FIGS. 6 and 7 are time charts for explaining the effects of the present invention in comparison with the conventional call signal generating circuit.
Figure 7:
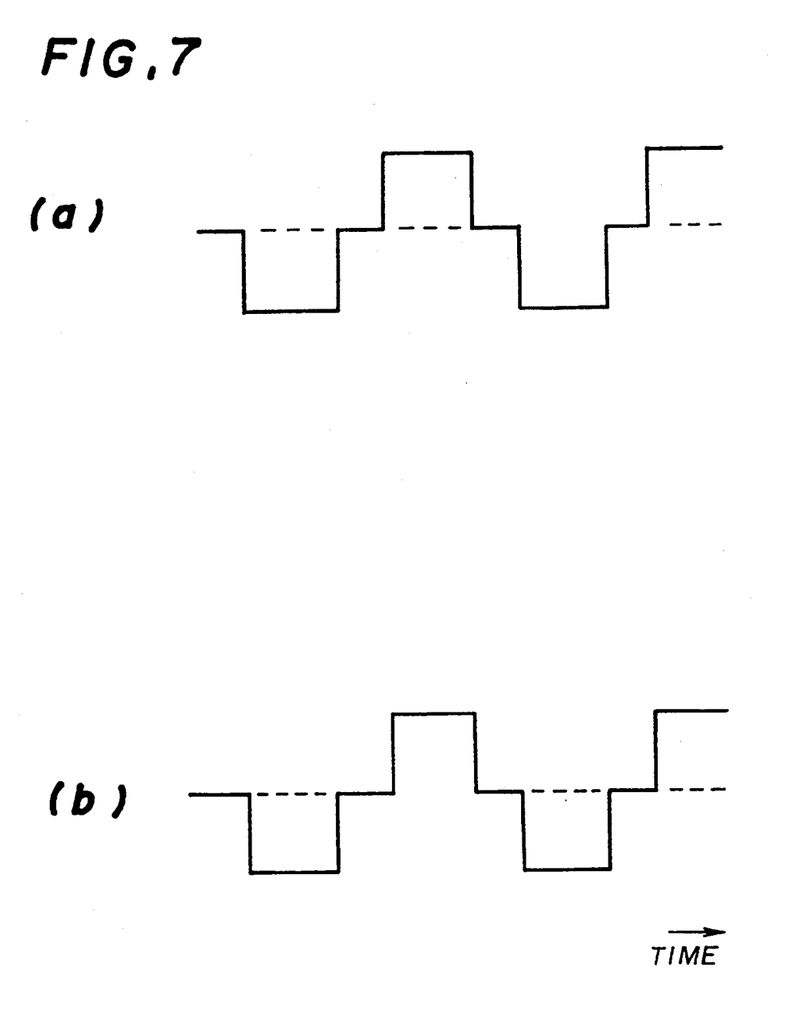

FIGS. 6 and 7 are time charts for explaining the effects of the present invention in comparison with the conventional call signal generating circuit.

FIG. 6 shows the call signal waveform obtained by the conventional call signal generating circuit shown in FIG. 1. In FIG. 6, (a) shows the call signal waveform when no telephone set is connected to the call signal generating circuit, and (b) shows the call signal waveform when one telephone set is connected to the call signal generating circuit. As may be seen from FIG. 6, particularly the falling edge (and the corresponding rising edge) of the call signal waveform is gradual.

On the other hand, FIG. 7 shows the call signal waveform obtained by the call signal generating circuit shown in FIG. 4. In FIG. 7, (a) shows the call signal waveform when no telephone set is connected to the call signal generating circuit, and (b) shows the call signal waveform when one telephone set is connected to the call signal generating circuit. As may be seen from FIG. 7, the falling edge (and the corresponding rising edge) of the call signal waveform is sharp compared to the call signal waveform shown in FIG. 6.

Further, the present invention is not limited to these embodiments, but various variations and modifications may be made without departing from the scope of the present invention.

What is claimed is:
1. A call signal generating circuit comprising:
a step-up transformer having a primary winding and secondary windings;
first switching means, coupled between the primary winding of said step-up transformer and a D.C. power source, for turning ON/OFF at a frequency higher than a frequency of a call signal which is to be generated by the call signal generating circuit;
rectifying means, coupled to the secondary windings of said step-up transformer, for rectifying voltages induced at the secondary windings into a positive polarity voltage and a negative polarity voltage;
second switching means, coupled to said rectifying means and responsive to the positive and negative polarity voltages, for alternately outputting a positive polarity square wave voltage and a negative polarity square wave voltage with a quiescent time in which both the positive and negative polarity square wave voltages are not output;

a capacitor, having first and second terminals coupled to said second switching means, for receiving the positive and negative polarity square wave voltages output from said second switching means;

a resister coupled to the first terminal of said capacitor;

third switching means, coupled to said resistor, for discharging said capacitor during the quiescent time, said resistor and said third switching means being coupled in series to form a series circuit which is coupled in parallel to the first and second terminals of said capacitor; and a pair of output terminals, respectively coupled to the first and second terminals of said capacitor, for outputting the call signal.

2. The call signal generating circuit as claimed in claim 1, wherein said rectifying means includes a pair of diodes for respectively rectifying the voltages induced at the secondary windings of said step-up transformer.

3. The call signal generating circuit as claimed in claim 1, which further comprises control means, coupled to said first, second and third switching means, for controlling ON/OFF timings of said first, second and third switching means.

4. The call signal generating circuit as claimed in claim 3, wherein said second switching means includes first and second transistors for respectively outputting the positive polarity square wave voltage and the negative polarity square wave voltage output from said rectifying means, and said first and second transistors are turned ON/OFF by said control means.

5. The call signal generating circuit as claimed in claim 4, wherein said control means includes first and second light emitting elements which respectively form first and second photo couplers together with the corresponding first and second transistors of said second switching means.

6. The call signal generating circuit as claimed in claim 3, wherein said third switching means includes a transistor which is turned ON/OFF by said control means.

7. The call signal generating circuit as claimed in claim 6, wherein said control means includes a light emitting element which forms a photo coupler together with the transistor of said third switching means.

8. The call signal generating circuit as claimed in claim 1, wherein the call signal output via said output terminals has a frequency of 16 Hz and a staircase waveform approximating a crest factor of a sinusoidal waveform.

9. The call signal generating circuit as claimed in claim 1, wherein said first switching means is turned ON/OFF at a frequency of approximately several tens of kHz, and the call signal output via said output terminals has a frequency of 16 Hz and a peak voltage of 75 V.

* * * * *